July 17, 1956  A. M. GRASS  2,754,721
ELECTRICALLY OPERATED AUTOMATIC CAMERA
Filed April 1, 1952  4 Sheets-Sheet 1
Fig. 1
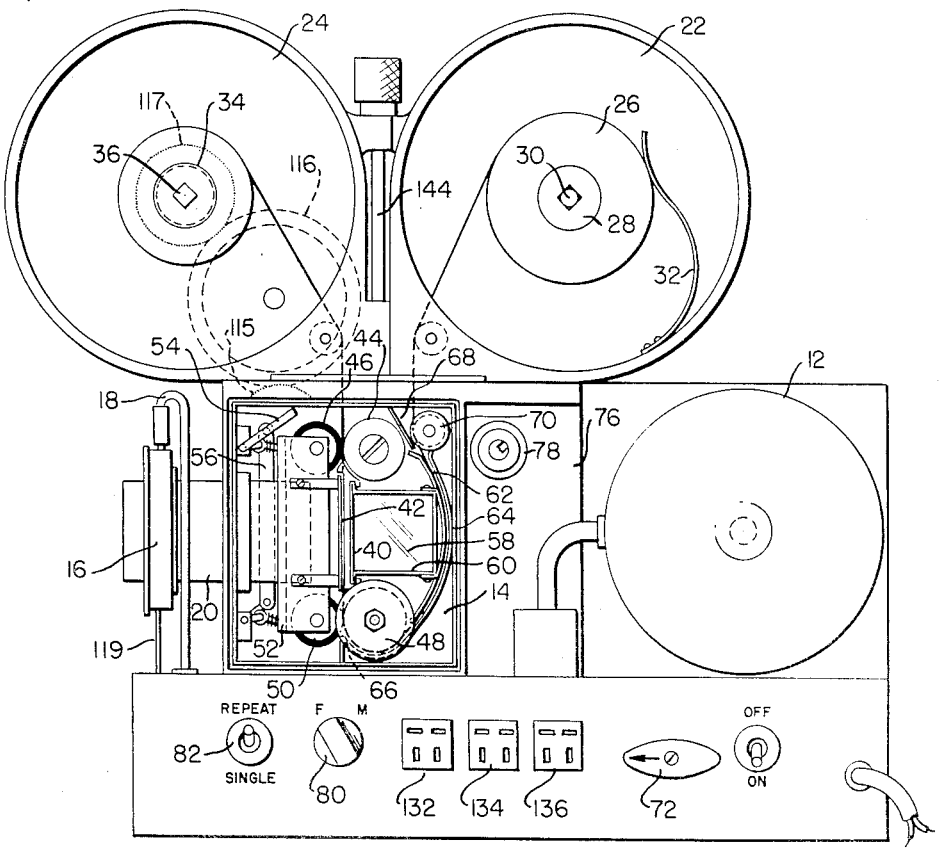
Fig. 2
INVENTOR.
ALBERT M. GRASS
BY
ATTORNEYS July 17, 1956  A. M. GRASS  2,754,721
ELECTRICALLY OPERATED AUTOMATIC CAMERA
Filed April 1, 1952  4 Sheets-Sheet 2

*INVENTOR.*
ALBERT M. GRASS
BY
ATTORNEYS

July 17, 1956     A. M. GRASS     2,754,721
ELECTRICALLY OPERATED AUTOMATIC CAMERA
Filed April 1, 1952     4 Sheets-Sheet 4
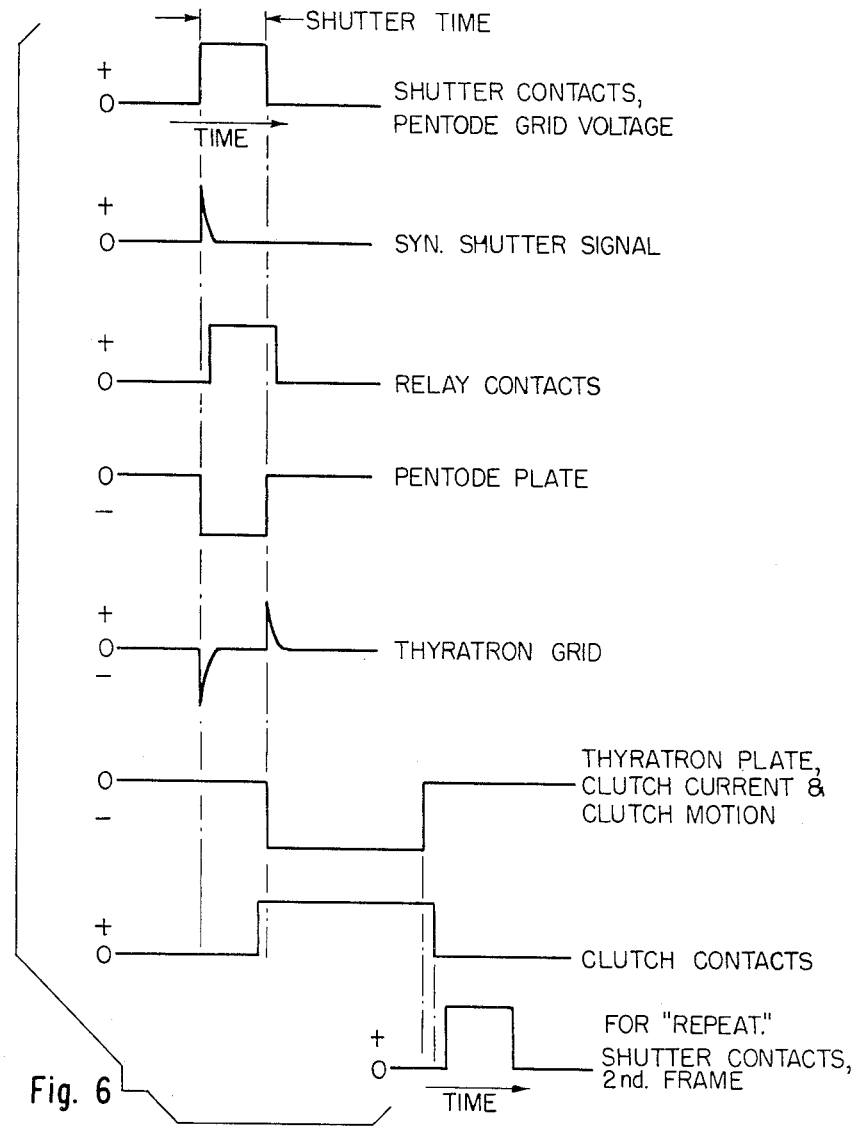
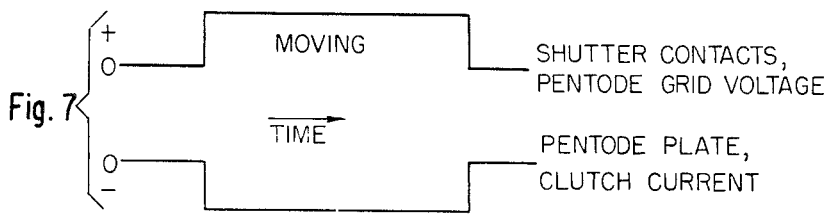
*INVENTOR.*
ALBERT M. GRASS
BY
ATTORNEYS

United States Patent Office 2,754,721
Patented July 17, 1956

2,754,721

ELECTRICALLY OPERATED AUTOMATIC CAMERA

Albert M. Grass, Quincy, Mass.

Application April 1, 1952, Serial No. 279,761

5 Claims. (Cl. 88—18)

The present invention relates to cameras, and more particularly to cameras for making photographs under a wide variety of selected conditions, as in the photography of scientific phenomena, the recording of cathode ray traces, the photography of phenomena at precisely timed intervals, and the like.

One object of the present invention is to provide means for selectively photographing on successive frames or on continuously moving film.

Another object is to provide a sequence control whereby the operation of the shutter controls the film transport and may be utilized to control the operation of the subject to be photographed, or the illumination thereof.

Another object is to provide improvements in the construction of a camera, with respect to film magazines, mechanisms for changing the speed of film transport, and the like.

With the foregoing and other objects in view, as will hereinafter appear, the present invention comprises the camera and associated equipment hereinafter described and particularly defined in the claims.

Figure 3:
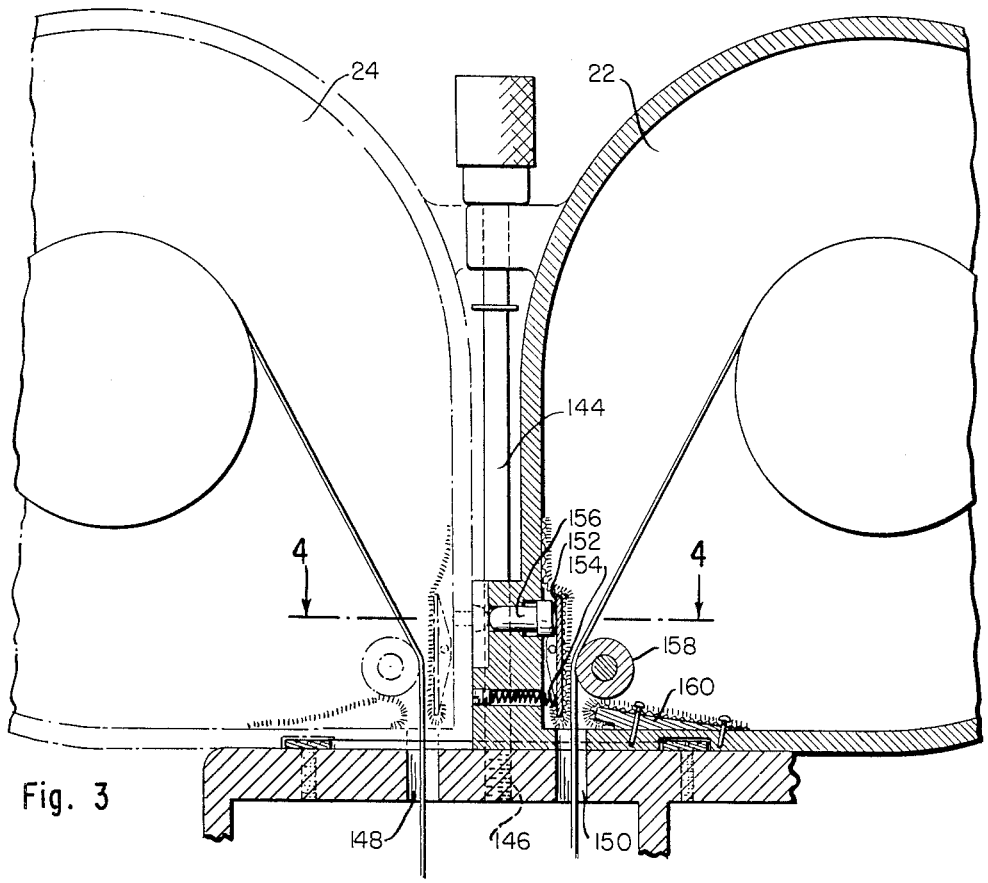
Figure 4:
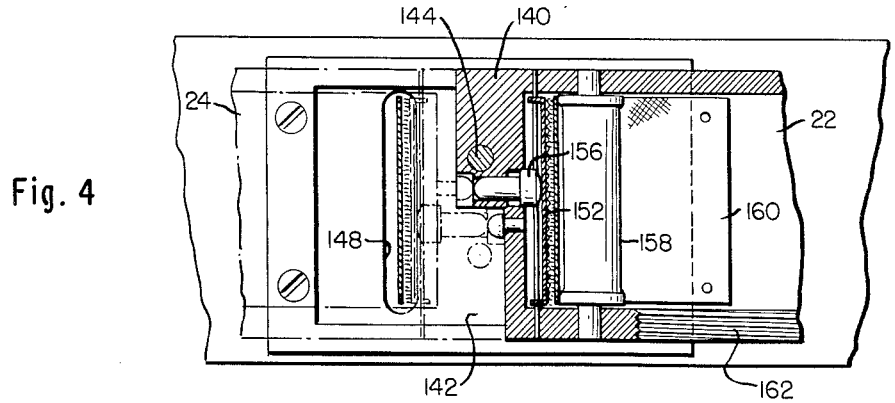
Figure 5:
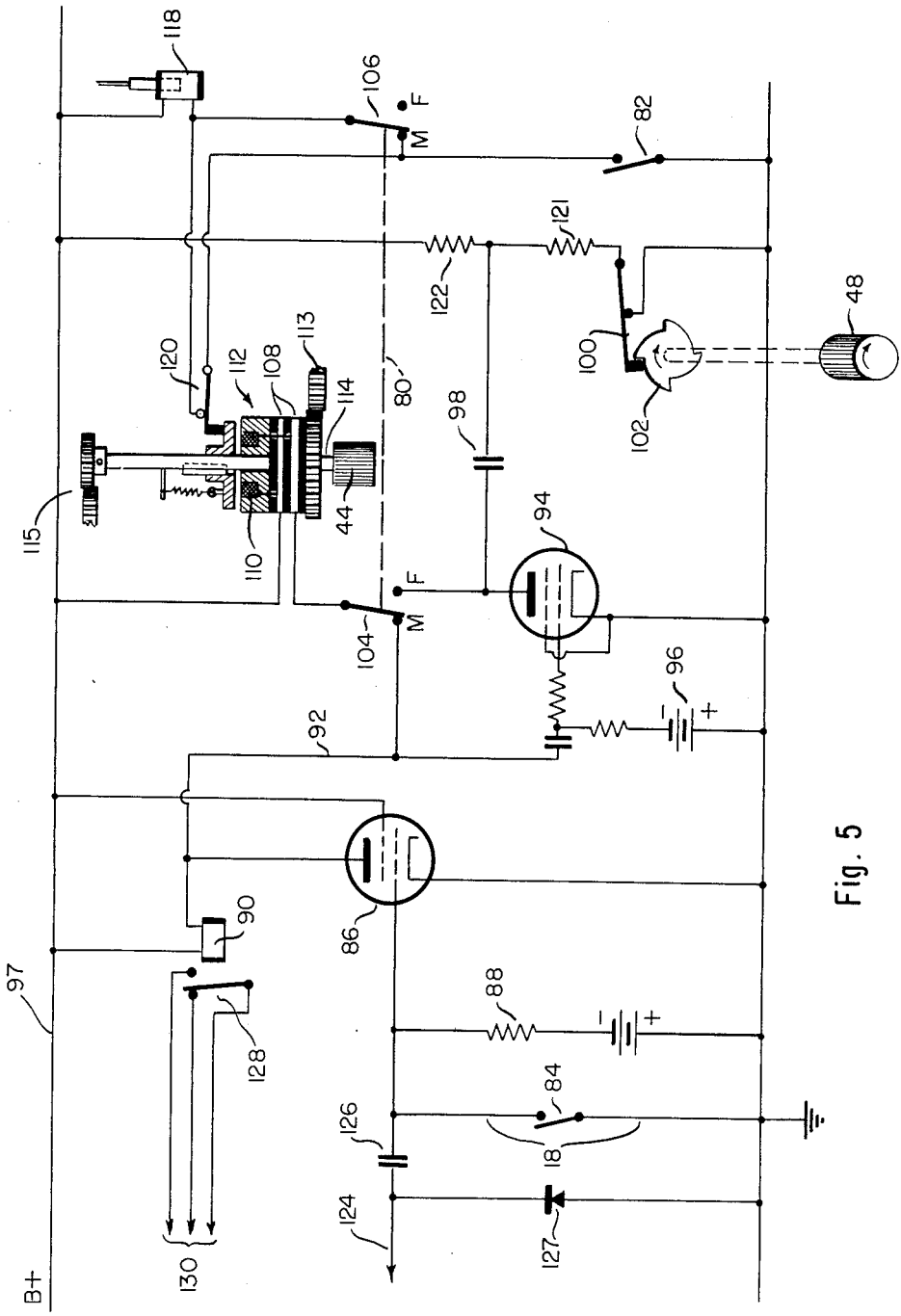

In the accompanying drawings, Fig. 1 is a side elevation of the preferred form of camera; Fig. 2 is a detail of the feed roller; Fig. 3 is a sectional elevation of the magazines; Fig. 4 is a section on line 4—4 of Fig. 3; Fig. 5 is a diagram of the electrical connections, and Figs. 6 and 7 are diagrams illustrating the sequence of operations.

The apparatus shown in Fig. 1 comprises a base 10 within which is received the control equipment to be later described, and on which is mounted a drive motor 12. At the front of the base is mounted the camera proper which comprises the exposure compartment 14 and the lens and shutter assembly 16. The shutter is preferably of the self cocking type and is provided with internal contacts (not shown) similar to those used for flash synchronization and adapted to be closed when the shutter blades are wide open and to open immediately before the blades start to close. A cable 18 leads from the shutter contacts to the control circuits in a manner to be later described. The shutter and lens assembly is mounted on a tube 20 which may be slid back and forth slightly with respect to the exposure chamber for purposes of focusing.

Two magazines 22 and 24 are provided. The supply of sensitized material such as film or paper shown at 26 is contained within the supply magazine 22. The supply is mounted on a core 28 which is supported on a central shaft 30 with only sufficient friction to permit orderly unrolling of the film without coiling. Alternatively, a spring brake 32 may bear directly against the sensitized material itself, whereby the braking action decreases as the size of the roll decreases thereby more correctly relating the braking action to the inertia of the roll.

The magazine 24 is a take-up magazine having a core 34 to which the film is connected in any suitable manner. The core 34 is mounted on a shaft 36 which is driven through a friction clutch at a speed suitable for take-up in a manner to be described presently.

The length of film between the magazines runs through the magazine 22 in a manner to be described later, and loops through the exposure chamber and thence to the take-up magazine 24.

Within the exposure chamber there is a fixed gate 40 and a movable gate 42 between which the film is guided during exposure. Above the gates is a drive roller 44 which engages the back of the sensitized material, that is, the shiny side of the film of the base of the paper and presses it against a rubber covered roll 46. In order to permit use of unperforated film or paper, the roller 44 firmly engages the sensitized material and is therefore preferably formed with sharp longitudinal teeth in the manner of a spur gear as shown in Fig. 2, the teeth being indicated at 47. These engage the sensitized material with sufficient firmness to insure precise transport, but they do not mar the surface.

Control roller 48 similar to the roller 44 is provided below the gates and is adapted to engage the film between it and a rubber covered roller 50, which is similar to the roller 46. While the roller 44 is used to drive the film, the roller 48 is driven by the film and is itself used to control various operations to be presently described.

The movable gate 42 and the rollers 46 and 50 are mounted on a laterally movable carriage 52 which is operated by a lever 54 through suitable linkage 56 to move the gate and rubber rollers to the left and thereby permit insertion of the film.

A 45 degree mirror 58 is mounted in back of the film gate 40 and is arranged to permit the rear of the film to be observed from the side of the apparatus for focusing and for other purposes as will be later described. The mirror is contained in a frame 60 and in back of the frame is a curved guide plate 62 over which the film passes. A second guide plate 64 is spaced from the guide 62 and it runs under the roller 48 to terminate in an upwardly directed portion 66. The space between the guides 62 and 64 forms a trough to permit threading of the film into the camera. Entering the film into the trough is facilitated by an inclined guide plate 68 and a spool 70 at the upper part of the exposure chamber.

To thread the film the end of the film protruding from the supply magazine 22 is threaded into the trough between the guides 62 and 64 and is pushed until its end appears above the portion 66 of the outer guard. At this time the carriage 52 will be at the left, thereby affording substantial space between the toothed rollers 44 and 48 and their respective rubber rollers 46 and 50. A vertical plate may then be inserted against the part 66 of the guide plate, and upon further advance of the film the end of the film will slide along the vertical plate to enter the take-up magazine 24. The end of the film is then attached to the core 34 and the threading is completed, the vertical guide plate being then removed. The carriage 52 is then restored to its position whereby the film is closely maintained between the two gates 40 and 42. A cover is provided for the exposure chamber and the cover has a dark slide by which the rear of the film may be viewed in the mirror 58; focusing is done by adjusting the lens and shutter assembly until a clearly focused view is observed in the mirror. After the camera is threaded, the focusing operation admits light only to a single frame and hence only the frame which is in position when the focusing operation is being carried on is wasted.

The motor may be driven at a number of speeds controlled by a switch 72 on the base; preferably three speeds are provided. The motor is connected through gears 74 with a change speed mechanism 76, which may be of any suitable form. For the purposes of this description, it is sufficient to state that the operation of the gear box is controlled by a sliding sleeve 78. The gear box, whatever its construction, is preferably designed for a decade operation whereby the speed may be controlled in jumps of 10. It has been found for most convenient operation, the maximum film speed obtainable from the motor at full speed is one meter per second. The gear box preferably reduces the speed in the ratios 1/10, 1/100 and 1/1000 whereby speeds of $\frac{1}{10}$ meter, 1 cm. and 1 mm. per second may be obtained. The switch 72 preferably controls operation of the motor at half and quarter speeds, so that a still finer selection is obtainable. It will be seen, therefore, that the film speed is variable in relatively small steps from .25 mm. to 1 meter per second.

On the panel there is mounted a switch 80 by which the operator may selectively determine continuous motion or framed motion of the film. A manual switch 82 is used to initiate the operation.

The operation of this system will best be understood by reference to the wiring diagram of Fig. 5. The internal shutter contacts are shown at 84 and are connected by the cable 18 between ground and the grid of a pentode 86 which is normally negatively biased through a resistance 88, but when the switch is closed the grid potential is brought to zero. The plate of the pentode is connected to a relay 90 for controlling external operations in a manner to be described. It is also connected by a wire 92 with the input circuit of a thyratron tube 94 which normally has a negative potential applied to its control grid by a battery 96. The relay circuit 90 is energized from a source of positive voltage 97.

The anode of the thyratron is connected through a condenser 98 with a control circuit comprising a switch 100 operated by cam 102 driven by the control roller 48 which, as heretofore noted, is driven by the film itself.

The switch 80 which selects between continuous and intermittent motion has two movable contacts indicated at 104 and 106. The contact 104 is adapted for selective engagement with a fixed contact designated M which is connected to the wire 92, or to a contact F which is connected to the anode of the thyratron. The movable contact 104 itself is connected to two slip rings 108 leading to the magnetic clutch coil 110 of the drive clutch 112 which is connected to the output gear 113 of the variable speed gear box 76. When the coil 110 is energized the clutch is connected, thereby driving the shaft 114 on which the drive roller 44 is mounted. The shaft has gearing 115 to drive a rubber-covered roll 116 (Fig. 1) which in turn drives the film take-up core 34 through a suitable friction clutch, shown at 117.

The movable contact 106 of the selector switch is adapted in its left hand position to engage a contact designated M whereby when the main switch 82 is closed a circuit is closed through the solenoid 118, the latter being connected to the shutter trip 119 to operate the shutter.

When the selector switch 80 is in its right hand position, the contact 106 is dead. Contacts 120, however, which are actuated by the clutch are in parallel to the contact 106 and its corresponding fixed contact M, whereby when the clutch is disconnected a circuit will run through the switch 82 when closed, the contact 120, and the shutter tripping solenoid 118. The operation is described as follows. Assume that the switch 80 is set on M, that is for continuously moving film, and that the shutter is set for a designated exposure, say 1 second. Upon closure of the manual switch 82 the solenoid 118 is energized, thereby opening the shutter. When the shutter leaves are opened the shutter contacts 84 are closed, thereby applying a positive potential to the pentode 86. The pentode plate circuit then becomes conducting and the clutch current flows through the coils 110 and through the connection 92 through the pentode. The clutch is energized and the film drive is operated to run the film at the speed dictated by the motor and gear box settings. When the shutter closes the contact 84 is opened, thereby opening the pentode circuit and cutting off the clutch current, thus deenergizing the clutch and stopping the film.

When the selector switch 80 is set on the F contacts designating operation by individual frames, the solenoid 118 is operated through the back clutch contacts 120 when the switch 82 is closed. (It will be assumed that the switch 82 is closed and then immediately released for single frame operation.) The solenoid 118 then operates the shutter trip for exposure of the designated amount. When the shutter switch 84 closes, the pentode anode circuit draws current, thereby lowering the anode potential of the pentode and applying a negative pulse to the thyratron 94. The thyratron does not then conduct; however, the exposure is completed within the designated time and at the conclusion of the exposure the shutter blades close, thereby opening the contact 84 and cutting off the plate current of the pentode 86. This causes a positive pulse to be applied to the thyratron grid, thereby causing conduction through the thyratron plate circuit. The clutch current now leads through the clutch coil and slip rings 108 through contact 104 and its fixed contact F, and the thyratron plate to ground. The clutch is energized and the film is accordingly transported. During this motion the control roller 48 is operated. At this time the contacts 100 are closed, but as the cam 102 turns the switch contacts 100 open. Before they open the right hand side of the condenser 98 is connected to ground through the resistor 121, which is of relatively low value, say 500 ohms, as compared with the resistor 122 which is preferably of the order of 100,000 ohms. When the contacts 100 are opened by the rotation of the cam 102 the condenser 98 is charged positively through the resistor 122, but this does not affect the conduction of the thyratron. When the cam 102 is turned the distance corresponding to the correct framing operation, represented here as a quarter revolution, the contact 100 drops off, thereby closing the contacts and again grounding the condenser 98 through the resistor 121. This is the equivalent of applying a negative pulse to the thyratron anode, thereby cutting off conduction which results in deenergizing the clutch and causing the film to stop. It will be seen, therefore, that the cam 102 always indexes in a manner to leave the contact 100 in the position shown in the drawing.

For repeat operation the switch 82 is simply held closed, since upon release of the clutch the contacts 120 will again close and start a new cycle of operation. The mechanical arrangement of switch 82 is such that it may be snapped to an upper position marked repeat where it will lock closed, whereas in its lower position it will remain closed only so long as manually held.

For control of external apparatus a synchronizing lead 124 is connected from the pentode grid through a condenser 126. Upon closure of switch 84 a positive pulse is sent through the condenser and it may be used for any desired purpose, as for example, to initiate operation of the subject or phenomenon to be photographed. A rectifier 127 may be used to short-circuit negative pulses. In similar fashion, the relay 90 having contacts 128 may be connected to external connections 130, also to operate any desired external equipment. The external outlets for these devices are shown at 132 and 134 respectively. Also an outlet 136 may be provided to give strobe flash signals at definite intervals with moving film, the outlet being connected to a suitable switch driven by the roller 48.

One point in connection with the thyratron circuit may be mentioned. The condenser 98 is preferably grounded through the resistor 121 of, say 500 ohms, rather than to ground it directly, because upon closing of the switch contacts 100 the discharge of the condenser through the local circuit including the thyratron might cause damage to the thyratron unless the current limiting resistor 121 were used.

The sequence of operations is illustrated in Figs. 6 and 7, the former for frame operation and the latter for moving film operation.

In Fig. 6 the time of shutter opening is shown in the upper graph, the second graph shows the synchronized shutter signal obtainable at point 124. The next graph shows the potential available at the relay contacts, and the next the negative potential available at the pentode plate. The next graph shows the successive negative and positive pulses applied to the thyratron grid. The next graph designates the thyratron plate or clutch current as well as the clutch motion. The operation of the clutch contacts 120 is represented in the next graph. For a repeat operation the shutter contacts operate as shown in the bottom graph.

In Fig. 7 the conditions for continuously moving film are shown. The upper graph shows the time of opening the shutter contacts and the pentode grid voltage, while the lower graph represents the pentode plate voltage and the clutch current.

The details of the magazines are shown in Figs. 3 and 4; the supply magazine 22 has a boss 140, and the take-up magazine 24 has a boss 142, both arranged to fit together as shown in Fig. 4. Each boss carries a long screw shown at 144 for the take-up magazine, and adapted to be threaded into the top of the frame as indicated at 146. The magazines fit tightly on top of the frame and connect with slots 148 and 150 therein.

The magazines are provided with light traps, which for the supply magazine 22 comprises a fur covered plate 152 suitably pivoted on the magazine proper and urged into closed position by a spring 154. A pin 156 engages the upper end of the plate. The film passes over a roll 158 near the mouth of the magazine and also passes adjacent to a stationary fur covered plate 160. When the magazine is removed from the frame the spring 154 urges the plate 152 against the stationary part 160 and also against the roller 158, thereby preventing access of light to the interior of the magazine. Upon attachment of the magazines, however, the pin 156 presses on the plate 152 in a manner to open the light trap as shown in Fig. 3. The magazines are provided with threaded covers to be received in the threaded openings shown at 162 for the supply magazine, although the covers are not shown in the drawings.

All parts of the drive should be such as to withstand the rapid accelerations in film transport. The gears of the gear mechanism 76 are preferably of tough plastic such as nylon. The take-up core 34 is necessarily driven at a higher speed than the roll 44 and hence is driven through a suitable friction clutch mechanism which preferably comprises nylon members, since they have been found to give substantially the same running friction as starting friction.

It will be understood that sprockets may be substituted for the rollers 44 and 48 if only perforated film is to be used; however, the rollers 44 and 48 as shown herein permit the use of either perforated or unperforated film in the camera. It will be understood that a perforated film must be used in any event if it is to be later projected in a motion picture projector.

The operation will now be described. In this description the term film will be used to designate sensitized material and is intended to mean either film or paper. The film in a suitable roll is loaded in the magazine 22 in the dark and the leading end is brought out through the light trap. The magazines are mounted on the frame and the film is then threaded through the guides in the manner described above, and is suitably connected to the core 34 of the take-up magazine. The magazine 24 is then closed with its cover and the exposure chamber 14 is then suitably covered. A sufficient amount of film is then run on to the take-up core so that unexposed film is available at the gates.

First, suppose the switch 80 is set at M, namely, for moving film operation. After focusing, the switch 82 is depressed and released. The solenoid 18 operates the shutter switch 84 to open the shutter for the time for which the shutter is set. If the shutter is set for 1 second, the shutter blades are open for that time and then they close. During the period of 1 second, for which the shutter is open, the film is transported continuously at the speed dictated by the setting of the motor and the gear box, the maximum speed being preferably about 1 meter per second. This operation is convenient for taking a photograph of cathode ray operation for a designated time. If the shutter is set at "bulb" the shutter will remain open and the film will be transported so long as the switch 82 is depressed. If the shutter is set at "time," two operations of the switch 82 are required and the film will be moved continuously between such two operations.

A synchronizing pulse is available at 124 when the shutter blades open, and this may be used to initiate any desired operation. Potential is also available at the relay contacts 130 during the entire time the shutter is open. Pulses synchronized with the moving film are also available at 136 for purposes such as strobe flash.

For single frame operation the switch 80 is set at F. Upon depression and release of the switch 82 a single exposure is made on the frame at the speed for which the shutter is set, and immediately at the conclusion of the exposure the film is transported to bring a new frame into exposure position. The speed of transport is determined by the motor setting as well as the gear box setting.

For "repeat" operation it is only necessary to hold the switch down, with the understanding, of course, that the shutter must be on one of the measured settings and not on "bulb" or "time." Alternatively, the switch 82 is preferably of such mechanical construction that when flipped upwardly it will remain closed. The first cycle then proceeds exactly as for single frame operation, but upon release of the clutch 112, the clutch contacts 120 are closed so that a new cycle of operations is repeated. This continues as long as the switch 82 remains closed. It is possible to take up to about 4 exposures per second by this procedure. The frames are spaced as in ordinary motion picture film, and may be later projected. This operation is especially suitable for "growth" pictures, since when the motor and gear box speeds are set to their minimum values, the film transport between frames may be slowed down so that a minute or more may be required to advance from one frame to the next.

Having thus described the invention, I claim:

1. A camera comprising a lens, a shutter having different exposure settings, film transport means to engage a strip of film, a variable speed drive for the film transport means, means for operating the shutter, electrical switching means controlled by the shutter at the conclusion of an exposure for initiating operation of the variable speed drive, film measuring means for stopping the drive upon framing the film for a new exposure, and electromagnetic means controlled by stopping of the drive for operating the shutter.

2. A camera comprising a lens, a shutter having different exposure settings, film transport means to engage a strip of film, a variable speed drive for the film transport means, means for operating the shutter, electrical switching means controlled by the shutter at the conclusion of an exposure for initiating operation of the variable speed drive, a clutch for the drive, film measuring means for disengaging the clutch upon framing of the film for a new exposure, and electromagnetic means operated upon disengagement of the clutch for operating the shutter.

3. A camera comprising a lens, a shutter having different exposure settings, film transport means to engage a strip of film, a variable speed drive for the film transport means, means for operating the shutter, a grid-controlled ignition tube for operating the variable-speed drive, electrical switching means controlled by the shutter at the conclusion of an exposure for effecting conduction in the tube to initiate operation of the variable-speed drive, film measuring means for cutting off conduction in the tube to stop the drive upon framing of the film for a new exposure, and electromagnetic means controlled by stopping of the drive to operate the shutter.

4. A camera comprising a lens, a shutter having different exposure settings and provided with shutter-operated contacts, film transport means, a variable speed drive for the film transport means, an electrically operated clutch, two tube circuits connected with the clutch, a manually operated selector switch for determining continuous or intermittent film transport and having provision for connecting the clutch to one or the other of the tube circuits, means operated by the shutter contacts for engaging the clutch for the duration of the exposure when the switch is set for continuous operation, and means controlled by the shutter contacts at the conclusion of an exposure for causing engagement of the clutch for film transport when the selector switch is set for intermittent operation.

5. A camera comprising a lens, a shutter having different exposure settings and provided with shutter-operated contacts, film transport means, a variable speed drive for the film transport means, an electrically operated clutch, an ignition-type tube adapted to be connected with the clutch, a control tube, a manual switch for selecting continuous or intermittent film transport for connecting the clutch selectively with the ignition tube or the control tube, a connection from the control tube to the ignition tube to control ignition of the latter, means operated by the shutter contacts for engaging the clutch for the duration of the exposure when the switch is set for continuous operation, and means controlled by the shutter contacts at the conclusion of an exposure, when the switch is set for intermittent operation, to effect clutch energization through the ignition tube.

References Cited in the file of this patent

UNITED STATES PATENTS

| Number | Name | Date |
|---|---|---|
| Re. 18,956 | Dyche | Sept. 18, 1933 |
| 1,244,919 | Thomas | Oct. 30, 1917 |
| 1,253,285 | Selig | Jan. 15, 1918 |
| 1,315,224 | Hill | Sept. 9, 1919 |
| 1,988,981 | Debrie | Jan. 22, 1935 |
| 2,055,113 | Tondreau | Sept. 22, 1936 |
| 2,089,106 | Beck | Aug. 3, 1937 |
| 2,193,016 | Wood | Mar. 12, 1940 |
| 2,223,525 | Miller | Dec. 3, 1940 |
| 2,269,373 | Kitroser | Jan. 6, 1942 |
| 2,530,448 | Boecking | Nov. 21, 1950 |
| 2,552,250 | Bornemann et al. | May 8, 1951 |
| 2,569,031 | Warner et al. | Sept. 25, 1951 |

FOREIGN PATENTS

| Number | Country | Date |
|---|---|---|
| 557,050 | Great Britain | Nov. 2, 1943 |